Patented Dec. 10, 1929

1,739,305

UNITED STATES PATENT OFFICE

THOMAS PERCY HILDITCH, OF GRAPPENHALL, AND HAROLD JOSEPH WHEATON, OF LOWER WALTON, NEAR WARRINGTON, ENGLAND, ASSIGNORS, BY MESNE ASSIGNMENTS, TO HARRY N. HOLMES, OF OBERLIN, OHIO

PRODUCTION OF ABSORBENT MATERIAL

No Drawing. Application filed August 13, 1923, Serial No. 657,208, and in Great Britain August 14, 1922.

This invention relates to the manufacture and production of materials for use in processes, or apparatus, wherein a porous, or absorbent, material is required and more especially this invention provides a material which is useful in cases where it is requisite to employ a porous body, or absorbent, capable of resisting the action of acids; such for example, as for absorbing the electrolyte in electric batteries.

The materials are prepared, according to this invention, from compounds, of silica and sodium with, or without, a sodium aluminate, pyroborate, dichromate, bicarbonate, or the like, which compounds have been produced in the condition of a gel; for instance, as explained in the specifications of British Letters Patent Nos. 142,974 and 177,746 and in United States applications for Letters Patent Nos. 657,206 and 657,207 of even date herewith, and also as in United States application for Letters Patent No. 547,591 filed on March 28th, 1922. If desired the potassium, or ammonium, compounds may be used in cases where they are available.

According to British Patent 142,974 the compound is produced by treating a solution of sodium silicate with an acid, so as to neutralize a portion of the sodium, and afterwards drying the gel and washing it to free it from soluble salt. In British Patent 177,746 and U. S. Patent No. 1,586,764 the compound is produced by employing solutions of sodium silicate and sodium aluminate in such proportions and densities and under such conditions as to produce a homogeneous gel from the entire mass of the mixture as distinguished from a precipitate with residual mother liquor. In U. S. application No. 657,206 the compound is produced by mixing with a solution of sodium silicate a solution of an alkali-metal salt or salts of complex acids containing an acid radical capable of combining with additional alkali metal such as sodium pyroborate, sodium dichromate, sodium bicarbonate, sodium metaphosphate, sodium dihydrogen phosphate, sodium pyrosulphate, sodium bisulphate or sodium bisulphite. In U. S. application No. 657,207 the compound is produced by mixing with the sodium silicate solution solutions of such materials as sodium chlorate, disodium phosphate, sodium sulphate, sodium nitrate and sodium chloride. The gels are gently dried in a current of warm air so as to preserve the physical structure until they become just hard and then washed in a current of water which will break down the material from lumps into granules.

As a specific example of such a product the following disclosure from copending Patent No. 1,586,764 may be adduced. Four parts by weight of a solution of sodium silicate of 15° Twaddell is rapidly and thoroughly mixed with one part by weight of a solution of sodium aluminate of 25° Twaddell. This will produce a stiff gel of homogeneous structure embracing the entire mass of the mixed solutions which is then gently dried in a current of warm air until the gel becomes just hard. The hard gel is then washed whereupon it breaks down from lumps into granules and it is such a substance which constitutes the starting point of the present process.

The dried gel, produced according to any of the said, or analogous, methods, is sufficiently divided, preferably to the condition of a powder to render the particles of suitable size to make the product of the treatment according to this invention suitable for packing in an electric battery, or for other purposes for which it may be required. The divided or powdered, gel is then boiled in a dilute solution of an acid which may be of a character in accordance with the purpose for which the final product is required; for example, it may be a solution of sulphuric acid where the presence of chlorides is objectionable. The boiling operation is carried on until all matter which is soluble in the acid solution has been dissolved and then the material is thoroughly washed until it is free from the dissolved matter and it is subsequently dried until its moisture content is reduced to any requisite extent.

The product thus obtained is not attacked by acids and will efficiently occupy any receptacle, or container, in which it is placed while, owing to its high degree of porosity, the said product will also hold, dispersed in it, a large volume of liquid.

The following is an example of the manner in which this invention may be performed, but the invention is not limited to the details of this example.

Five parts, by weight, of the dried and washed gel is reduced to powder and placed in about, (preferably rather more than) five parts by weight, of water in a vessel provided with means for heating and agitating the mass. Three parts, by weight, of commercial sulphuric acid of 140° Twaddell are then added and the mixture is boiled and agitated for about three hours and the contents then allowed to settle. The acid liquor is then removed by any suitable means (such for example as a skimmer-pipe) and is replaced by clean water and the mass is boiled again for a short time and the contents again allowed to settle. The wash-water is then removed and replaced by clean water and boiling and settling repeated until no soluble salts are detected in the water after boiling and settling. After the supernatant water is removed the settled matter is dried to any desired extent, and the product, which is a powder consisting essentially of exceedingly porous, and almost pure silica, with more, or less, mechanically-retained moisture, is ready for use.

If desired, the washing may be conducted continuously in a filter-press or in any other suitable way, but it will generally be most convenient and economical to operate as in the foregoing example.

What we claim is:—

1. The herein described method of manufacturing porous or absorbent material from a gel containing silica which consists in finely dividing the dried gel, in boiling it in an acid soluton until the matter which is soluble in the acid solution has been dissolved, in washing the material until the acid solution and the matter dissolved therein are removed, and in drying the material.

2. The herein described method of manufacturing porous or absorbent material from a gel containing silica which consists in finely dividing the dried gel, in boiling it in an acid solution until the matter which is soluble in the acid solution has been dissolved, in removing the acid solution, in adding water, boiling, and removing the same until all soluble salts are eliminated, and in drying the material.

3. The herein described method of manufacturing porous or absorbent material from a gel containing silica which consists in boiling it in an acid solution until the matter which is soluble in the acid solution has been dissolved, and then in washing the material.

4. As a new article of manufacture, a porous or absorbent material produced by finely dividing dried gel containing silica, boiling it in an acid until all soluble matter has been dissolved, washing to remove the acid with its dissolved matter, and drying.

5. As a new article of manufacture, a porous or absorbent material produced by boiling a dried gel containing silica in an acid solution until all soluble matter has been dissolved, then washing and afterwards drying the material.

6. The process of increasing the porosity of inorganic gels, comprising precipitating a gel containing some material capable of conversion to soluble form by a given reagent and other material incapable of such conversion by the same reagent, treating said gel in a manner to produce the usual ultra-microscopic pores and to set and preserve the structure without subsequent material shrinkage of the pore walls, subsequently treating such gel with said reagent to thereby convert the first named material to water soluble form, and washing out the solution thereof, to thereby produce additional pores and increase the total porosity.

In testimony whereof we have signed our names to this specification.

THOMAS PERCY HILDITCH.
HAROLD JOSEPH WHEATON.